US008739244B1

(12) United States Patent
Wu et al.

(10) Patent No.: US 8,739,244 B1
(45) Date of Patent: May 27, 2014

(54) CONFIGURING AND AUTHENTICATING WAN OPTIMIZATION DEVICES FOR ACCESSING CONTENT DELIVERY NETWORKS

(75) Inventors: David Tze-Si Wu, Fremont, CA (US); John S. Cho, Dublin, CA (US); Kand Ly, Richmond, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 71 days.

(21) Appl. No.: 13/249,195

(22) Filed: Sep. 29, 2011

Related U.S. Application Data

(60) Provisional application No. 61/494,390, filed on Jun. 7, 2011.

(51) Int. Cl.
*H04L 29/06* (2006.01)
*G06F 21/00* (2013.01)

(52) U.S. Cl.
USPC ................................ 726/2; 713/168; 709/220

(58) Field of Classification Search
None
See application file for complete search history.

(56) References Cited

U.S. PATENT DOCUMENTS

| 2004/0268118 | A1 | 12/2004 | Bazan Bejarano |
| 2005/0246519 | A1 | 11/2005 | Ackerman et al. |
| 2005/0265327 | A1 | 12/2005 | Buch et al. |
| 2007/0022469 | A1 | 1/2007 | Cooper et al. |
| 2007/0130457 | A1 | 6/2007 | Kamat et al. |
| 2008/0209216 | A1 | 8/2008 | Kelly et al. |
| 2009/0024763 | A1 | 1/2009 | Stepin et al. |
| 2009/0037388 | A1 | 2/2009 | Cooper et al. |
| 2009/0228967 | A1 | 9/2009 | Gbadegesin et al. |
| 2010/0122175 | A1 | 5/2010 | Gupta et al. |
| 2010/0131659 | A1* | 5/2010 | Narayana et al. ............. 709/228 |
| 2010/0299525 | A1 | 11/2010 | Shah et al. |
| 2010/0318665 | A1 | 12/2010 | Demmer et al. |
| 2011/0153721 | A1 | 6/2011 | Agarwal et al. |
| 2011/0283011 | A1* | 11/2011 | Li et al. ........................ 709/231 |
| 2012/0266231 | A1 | 10/2012 | Spiers et al. |

FOREIGN PATENT DOCUMENTS

| EP | 1921557 | 5/2008 |
| WO | 2009066978 | 5/2009 |

* cited by examiner

*Primary Examiner* — Izunna Okeke
(74) *Attorney, Agent, or Firm* — Park, Vaughan, Fleming & Dowler LLP; Laxman Sahasrabuddhe

(57) ABSTRACT

WAN optimization devices and content delivery networks together optimize network traffic on both private networks and public WANs such as the internet. A WAN optimization device intercepts and optimizes network traffic from clients within a private network. The WAN optimization device communicates this first optimized network traffic to the nearest edge computer in the content delivery network via a public WAN, such as the internet. This edge computer further optimizes the network traffic and communicates the doubly optimized network traffic via the content delivery network to a second edge computer nearest to the network traffic destination. The second edge computer converts the doubly optimized network traffic back to its original format and communicates the reconstructed network traffic from the second edge computer to the destination via a public WAN. Licensing and configuration portals configure WAN optimization devices for specific network protocols, types of network traffic, applications, and/or cloud services.

16 Claims, 10 Drawing Sheets

CONFIGURING AND AUTHENTICATING WAN OPTIMIZATION DEVICES FOR ACCESSING CONTENT DELIVERY NETWORKS

CROSS-REFERENCE TO RELATED APPLICATIONS

This application claims priority to U.S. Provisional Patent Application No. 61/494,390, filed Jun. 7, 2011, and entitled "Integrating WAN Optimization Devices with Content Delivery Networks," which is incorporated by reference herein.

BACKGROUND

The invention relates to the field of computer networks and systems and methods for optimizing and accelerating network traffic. Many organizations are using so-called "cloud" computing to provide on-demand provisioning of computing resources, such as processing resources, storage resources, content hosting; and/or application software. In cloud computing, computing resources are accessed via a wide-area network, such as the internet, using client systems. Cloud computing systems may implement and provide access to any type of computing resource, software application, and/or service. Examples of cloud computing systems include the software-as-a-service (SaaS) and infrastructure-as-a-service (IaaS).

Because the majority of the processing and storage is provided by the cloud computing system, client systems accessing the cloud computing system typically do not require substantial computing resources and may only require a minimal operating system and/or web browser to access the resources provided via cloud computing. Additionally, the cloud computing system handles the majority of system configuration, system maintenance, and system and data backup and other reliability measures. Furthermore, cloud computing systems may consolidate computing resources for many different customers, thereby enhancing economies of scale. For these reasons, cloud computing systems are often less expensive and more reliable than locally-implemented computing systems.

However, the bandwidth and latency limitations of the wide-area network (WAN) that connects clients with cloud computing systems has a substantial impact on actual and perceived system performance. One approach to improving WAN performance, especially over the internet, is the use of a content delivery network. A content delivery network is a system of computers located at or near common network destinations, referred to as "edge" locations. The computers at these edge locations may prefetch and store copies of static content near potential destinations to decrease transit time and latency. For dynamic network traffic, these edge computers may perform enhanced network routing and TCP protocol optimization to reduce the impact of WAN latency on system performance. However, for dynamic content, this enhanced routing and TCP protocol optimization does not reduce the impact of WAN bandwidth limitations on system performance. Moreover, content delivery networks are typically limited to operating over the internet; therefore, they do not improve network performance within organizations' private local-area networks (LANs) and WANs behind firewalls. This limitation may have a substantial impact on the effectiveness of content delivery networks because many organizations include multiple branch location LANs connected via a private WAN.

WAN optimization devices are a second approach to improving WAN performance. A WAN optimization device typically monitors clients' network traffic to attempt to predict data likely to be requested by clients in the near future. This predicted data is prefetched over the WAN and stored by the WAN optimization devices at the clients' respective network locations, so that this data can be quickly accessed by users if requested. WAN optimization devices also typically compress data for communication over the WAN.

Additionally, WAN optimization devices may optimize both network protocols and application-level network traffic. In the latter case, WAN optimization devices analyze the content of network traffic to identify one or more associated software applications. Using knowledge of the behavior of these software applications, WAN optimization devices may better predict which data to prefetch and may streamline communications. For example, WAN optimization devices may speculatively issue additional network requests for data and/or operations in anticipation of future network requests from client systems. In contrast to WAN optimization devices, content delivery networks typically do not attempt to optimize network traffic at the application level. Furthermore, WAN optimization devices may host additional software services, applications, and/or virtual machine applications to simplify and/or streamline network performance. The WAN optimization devices' prefetching, storage, compression, and hosting capabilities mask the bandwidth and latency limitations of WANs from users.

WAN optimization devices may operate singly or in pairs at each side of a WAN connection to optimize network traffic. WAN optimization devices may be used with both private and public WANs, including, in the latter case, the internet. WAN optimization devices are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers. Additionally, techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. Herein, the term "WAN optimization device" is used to refer to such devices and applications and "WAN optimization" is used to refer to such techniques.

In summary, WAN optimization devices greatly improve actual and perceived system performance. However, WAN optimization devices typically need to be deployed at both the source and destination of network traffic. Many cloud computing systems (such as SaaS and IaaS) may not be able and/or willing to integrate WAN optimization devices into their infrastructure.

In contrast, content delivery networks are deployed on top of or in parallel with existing internet infrastructure. Therefore, content delivery networks may be used for almost any type of internet network traffic associated with any network source or destination. However, the performance improvements from content delivery networks are more limited than those provided by WAN optimization devices. Furthermore, content delivery networks typically do not operate within an organization's private LANs and/or WANs behind firewalls.

SUMMARY

Embodiments of the invention include systems and methods for integrating WAN optimization devices with content delivery networks. Embodiments of the invention may use WAN optimization devices and content delivery networks together to optimize network traffic on both private LANs and WANs within an organization and public WANs such as the internet. Additionally, embodiments of the invention enable WAN optimization techniques (and their associated increased performance benefits) over public WANs such as the internet without requiring cloud computing systems or other network destinations to integrate and configure WAN optimization devices.

In an embodiment, a WAN optimization device intercepts network traffic from one or more clients within an organization's networks. The WAN optimization device may compress and optimize some or all of this network traffic using techniques including data deduplication, data prefetching, and network protocol and application streamlining. The WAN optimization device then communicates this first optimized network traffic to the nearest edge computer in the content delivery network via a public WAN, such as the internet. This edge computer then further optimizes the network traffic and communicates the doubly optimized network traffic via the content delivery network to a second edge computer nearest to the network traffic destination. The second edge computer receives this doubly optimized network traffic and converts it back to its original format. This reconstructed network traffic is then communicated from the second edge computer to the destination cloud computing system or service via a public WAN.

In an embodiment, administrative users may use one or more licensing and configuration portals to configure WAN optimization devices and capabilities. A portal may provide WAN optimization devices with authentication information or credentials (such as an authentication token) used to access the content delivery network. A portal may also provide configuration information to WAN optimization devices to enable them to intercept and optimize different types of network traffic and/or cloud computing systems. In yet a further embodiment, users may purchase, rent, or otherwise license optimization capabilities for specific network protocols, types of network traffic, applications, and/or cloud computing systems. These additional optimization capabilities may be delivered to the administrative users from the portal in the form of configuration information needed to implement these optimizations with the user's WAN optimization devices and/ or authentication information used to access the content delivery network.

BRIEF DESCRIPTION OF THE DRAWINGS

The invention will be described with reference to the drawings, in which.

DETAILED DESCRIPTION

Embodiments of the invention include systems and methods for integrating WAN optimization devices with content delivery networks. Embodiments of the invention may use WAN optimization devices and content delivery networks together to optimize network traffic on both private LANs and WANs within an organization and public WANs such as the internet. Additionally, embodiments of the invention enable WAN optimization techniques (and their associated increased performance benefits) over public WANs such as the internet without requiring cloud computing systems or other network destinations to integrate and configure WAN optimization devices.

Figure 1A:
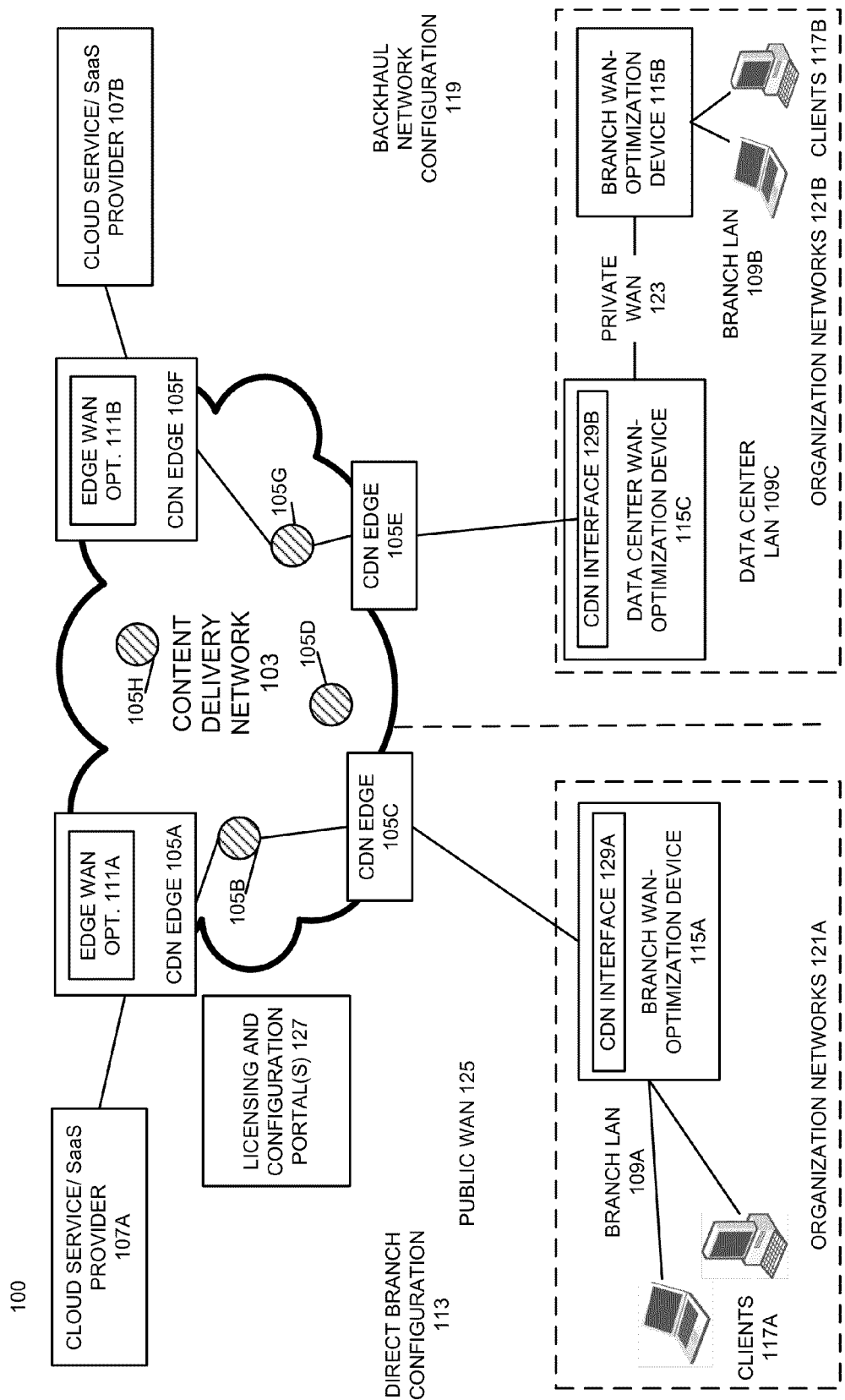
FIGS. 1A-1C illustrate example systems integrating WAN optimization devices with content delivery networks according to embodiments of the invention.

FIG. 1A illustrates two example systems integrating WAN optimization devices with content delivery networks according to embodiments of the invention. In both example systems, a content delivery network (CDN) 103 includes one or more edge computer systems 105 located close to (in terms of network topology) the sources and destinations of network traffic, such as cloud service providers 107 and client enterprises or other organizations 121. By locating edge computer systems 105 near sources and destinations of network traffic, the content delivery network 103 reduces network latency. The edge computer systems 105 are adapted to communicate with each other efficiently over a public WAN such as the internet or in parallel with the public WAN using a private backhaul network. Each of the edge computer systems 105 may use optimized routing and streamlined network protocols to efficiently transport network traffic to any other of the edge computer systems 105.

To integrate with WAN optimization devices and further improve network performance, at least some of the edge computers in the content delivery network 103, such as edge computers 105A and 105F, include WAN optimization capabilities. Edge computer WAN optimization capabilities may be implemented using WAN optimization hardware, software, or virtual machine modules 111, such as edge WAN optimization modules 111A and 111B. These WAN optimization capabilities in the edge computing systems operate in conjunction with WAN optimization devices within private networks in enterprises or other organizations. The WAN optimization capabilities of the edge computers 105 in the content delivery network are referred to as edge WAN optimization (EWO) capabilities.

In one embodiment, referred to as a direct branch configuration 113, a branch WAN optimization device (BWO) 115 located within a private LAN 109A of an organization's network 121A intercepts network traffic from clients 117A that is associated with a cloud computing system or service. The branch WAN optimization device 115 compresses and optimizes this network traffic using techniques including data deduplication, data prefetching, and network protocol and application streamlining. The branch WAN optimization device 115 then communicates this first optimized network traffic to the nearest edge computer 105C in the content delivery network 103 via a public WAN 125, such as the internet. This edge computer 105C then further optimizes the network traffic and communicates the doubly optimized network traffic via the content delivery network 103 to a second edge computer 105A nearest to the network traffic destination. The second edge computer 105A receives this doubly optimized network traffic and converts it back to its original format. This reconstructed network traffic is then communicated from the second edge computer 105A to the destination cloud computing system or service 107A. The reconstructed network traffic may also include additional network traffic introduced as part of the WAN optimization process, such as speculatively issued network requests for data, services, network protocol operations, and/or application-level operations.

In another embodiment, referred to as a backhaul network configuration 119, a branch WAN optimization device 115B located within a private LAN 109B of an organization's networks 121B intercepts network traffic associated with a cloud computing system or service from client systems 117B. The branch WAN optimization device 115B compresses and optimizes this network traffic using techniques including data deduplication, data prefetching, and network protocol and application streamlining. The branch WAN optimization device 115B then communicates this first optimized network traffic from a branch LAN 109B via a private WAN 123 to a data center LAN 109C and a data center device 115C, which may be another WAN optimization device or a standalone content delivery network interface. The data center device 115C is connected with the data center LAN (DCLAN) 109C and a public WAN 125 such as the internet. The data center device 115C communicates the optimized network traffic to the nearest edge computer 105E in the content delivery network 103. This edge computer 105E then further optimizes the network traffic and communicates the doubly optimized network traffic via the content delivery network 103 to a second edge computer 105F nearest to the network traffic destination. The second edge computer 105F receives this doubly optimized network traffic and converts it back to its original format. This reconstructed network traffic is then communicated from the second edge computer 105F to the destination cloud computing system or service 107B. As with the other embodiment discussed above, the reconstructed network traffic may also include additional network traffic introduced as part of the WAN optimization process.

In a further application of this second embodiment 119, the network traffic from a branch LAN 109B may be inspected, analyzed, and/or modified at the data center LAN 109C by a firewall, proxy, or other type of network inspection device. In this application, the data center WAN optimization device 115C and the branch WAN optimization device 115B are used to optimally transport network traffic from the branch LAN 109B to the data center LAN 109C through the private WAN 123. At the data center LAN 109C, the data center WAN optimization device 115C reconstructs the original network traffic for the purpose of inspection, analysis, and/or modification. The data center WAN optimization device 115C may provide the reconstructed network traffic to the network inspection device, which may be implemented as a separate network device or as a software process or virtual machine within the data center WAN optimization device 115C or any other device. Any network traffic that passes through this inspection network device is then forwarded back to the data center WAN optimization device 115C to reoptimize this network traffic.

The data center WAN optimization device 115C may perform similar types of optimizations as the branch WAN optimization device 115B. Once the network traffic has been reoptimized by the data center WAN optimization device 115C, the data center WAN optimization device 115C forwards this optimized network traffic to the closest edge computer 105E of the content delivery network 103. As described above, the edge computer 105E of the content delivery network 103 then further optimizes this network traffic for transport to the second edge computer 105F and ultimately its intended destination.

In both of these embodiments, the WAN optimization devices 115 provide enhanced data deduplication, data prefetching, and network protocol and application level (e.g. layer 7) optimizations that are not typically implemented in the content delivery network 1-3. Additionally, the content delivery system 103 provides optimized traffic routing and edge computers 105 located near network traffic sources and destinations to further reduce network latency.

In one embodiment, the content delivery network 103 directs optimized network traffic to the edge computer that it thinks is closest to the network destination and configures the WAN optimization application or device 111 at this location to operate with the branch WAN optimization device and/or data center devices 115. In another embodiment, the content delivery network 103 leverages auto-discovery capabilities of the WAN optimization devices 115 to identify and configure a WAN optimization application or device 111 at an edge computer 105. In this embodiment, the content delivery network 103 may pass auto-discovery messages and/or attributes, such as probe messages and/or flags or attributes embedded in messages, through its edge computers 105 and associated WAN optimization devices 111, such that the most appropriate WAN optimization application or device 111 at one of the edge computers 105 is automatically identified and configured by the other WAN optimization devices 115.

In a further embodiment, one or more licensing and configuration portals 127 are used to configure branch, data center, and/or edge computer WAN optimization devices and capabilities. A portal 127 may provide branch WAN optimization device and/or data center devices 115 with authentication information or credentials (such as an authentication token) used to access the content delivery network 103. A portal 127 may also provide configuration information to branch, data center, and/or edge computer WAN optimization devices to enable them to intercept and optimize different types of network traffic and/or cloud computing systems. In yet a further embodiment, users may purchase, rent, or otherwise license optimization capabilities for specific network protocols, types of network traffic, applications, and/or cloud computing systems. These additional optimization capabilities may be delivered to the user from the portal 127 in the form of configuration information needed to implement these optimizations with the user's WAN optimization devices 115 and/or authentication information used to access the content delivery network.

In an embodiment, configuration information may include domain names and/or network addresses (such as IP addresses) of cloud computing systems, edge WAN optimization devices or software modules, identifying characteristics of network traffic to be intercepted and optimized by the branch WAN optimization device, access and authentication parameters for the content delivery network, and optimization parameters used to specify the types of optimizations to be applied by the WAN optimization devices. In some cases, the network addresses (such as IP addresses) of cloud computing systems may not be known in advance or may change frequently. In a further embodiment, the portal and/or one of the WAN optimization devices may intercept DNS requests from client systems for domain names associated with the cloud computing system and use the network addresses received in the corresponding DNS replies to identify network traffic associated with the cloud computing system. In an alternate embodiment, the portal and/or one of the WAN optimization devices may initiate its own DNS requests to determine this information.

In an embodiment branch WAN optimization device or data center devices 115 include CDN interfaces 129 to retrieve authentication and configuration information from a portal 127 for one or more specific network protocols, types of network traffic, applications, and/or cloud computing systems. In response to this authentication and configuration information, the branch WAN optimization device or data center device 115 configures itself to intercept and optimize the network traffic corresponding with the network protocols, types of network traffic, applications, and/or cloud computing systems to be optimized. Additionally, the CDN interfaces 129 perform any required authentication with the content delivery network 103 to enable this optimized network traffic to access the content delivery network 103.

In an embodiment, the CDN interfaces 129 within the branch WAN optimization device and/or data center devices 115 may be implemented as a software module or as part of a virtual machine. Similarly, the WAN optimization capabilities provided by the edge computers 105 and WAN optimization devices 115 may be implemented as software applications or processes, virtual machines, and/or dedicated hardware.

In an embodiment, network traffic optimized by the branch WAN optimization device is encapsulated with an authentication token, previously provided by the portal.

In an embodiment, network security may be maintained by installing additional security certificates, such as SSL certificates, on the WAN optimization devices. In this embodiment, these certificates enable the WAN optimization at the branch and edge to intercept network traffic. In one implementation, the content delivery network uses its own security infrastructure to securely distribute security certificates and/or keys to the WAN optimization device or application at the edge computer located closest to the destination. In another implementation, the WAN optimization application or device at an edge computer may access the configuration portal to retrieve any necessary security certificates and/or keys.

Figure 1B:
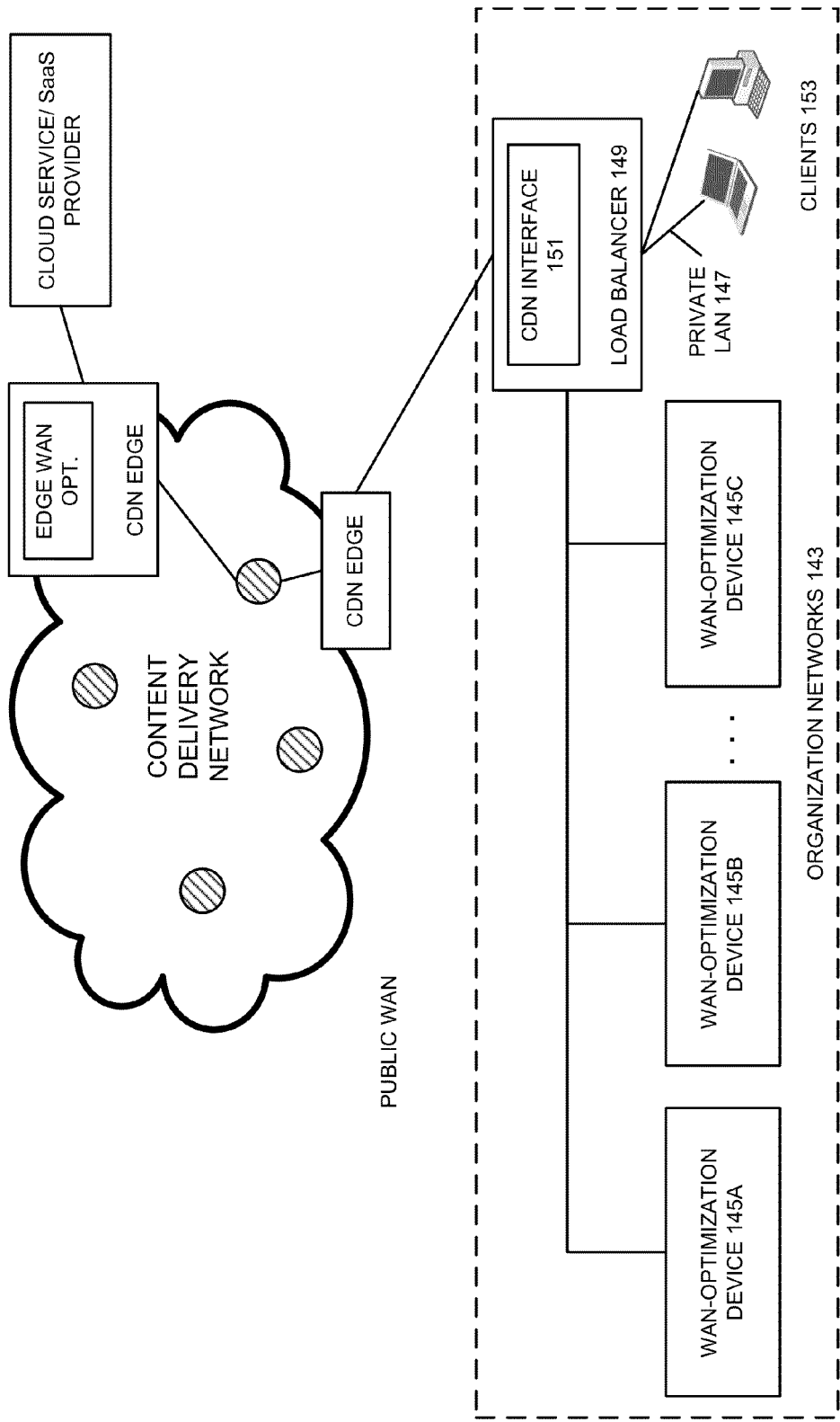
Figure 1C:
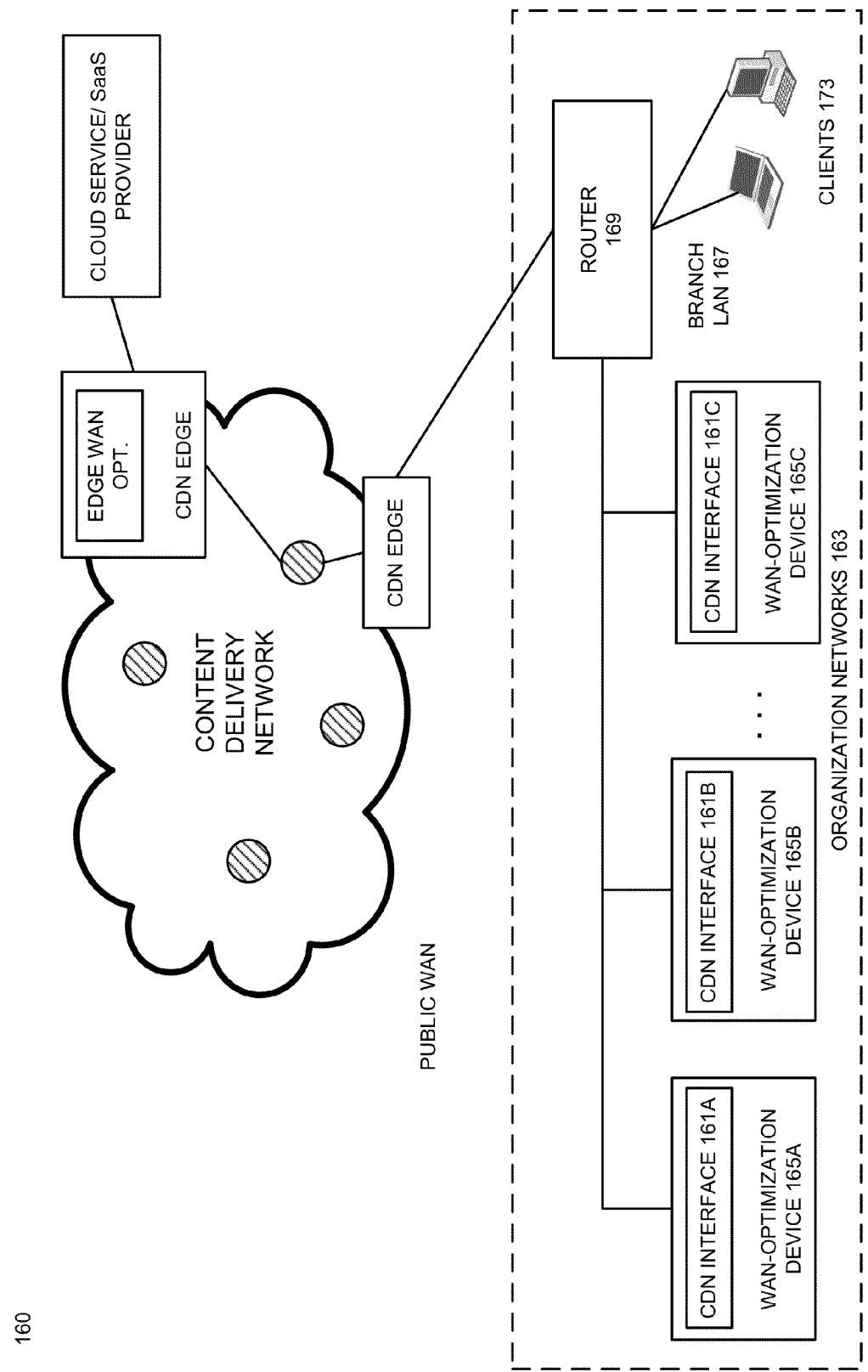

FIGS. 1B and 1C illustrate further example system configurations according to embodiments of the invention. FIG. 1B illustrates an example out-of-path WAN optimization device configuration 140. Configuration 140 includes a content delivery network and edge computers similar to those described in FIG. 1A. Within an organization's networks 143, a client 153 communicates over a private LAN 147 and optionally a private WAN with a load balancer system 149. Load balancer system 149 is connected with two or more WAN optimization devices 145, such as WAN optimization devices 145A, 145B, and 145C. These WAN optimization devices 145 may located at the data center network location or a branch network location, depending on whether the organization uses a direct branch configuration or a backhaul network configuration to connect with the public WAN and the content delivery network.

Upon intercepting network traffic, load balancer 149 redirects each network traffic flow to one of the WAN optimization devices according to any type of load balancing technique known in the art. The selected one of the WAN optimization devices 145 optimizes this network traffic as described above and then forwards it to the content delivery network. In an embodiment, each of the WAN optimization devices 145 forwards optimized network traffic back to the load balancer 149. The load balancer 149 includes a CDN interface 151 for transferring optimized network traffic to the content delivery network.

Similarly, FIG. 1C illustrates another example out-of-path WAN optimization device configuration 160. Configuration 160 includes a content delivery network and edge computers similar to those described in FIGS. 1A-1B. Within an organization's networks 163, a client 173 communicates over a private LAN 167 and optionally a private WAN with a router 169. Router 169 is configured to redirect some or all of the network traffic from one or more clients 173 to one or more WAN optimization devices 165. If the router 169 is configured to use a traffic routing protocol such as WCCP, the router 169 may redirect each network traffic flow to a selected one of two or more WAN optimization devices 165, such as WAN optimization devices 165A, 165B, or 165C. If the router 169 uses policy-based redirection, then there may only be a single WAN optimization device 165. These WAN optimization devices 165 may be located at the data center network location or a branch network location, depending on whether the organization uses a direct branch configuration or a backhaul network configuration to connect with the public WAN and the content delivery network.

Upon receiving an intercepted network traffic flow, the selected one of the WAN optimization devices 165 optimizes this network traffic as described above and then forwards it to the content delivery network. In an embodiment, each of the WAN optimization devices 165 includes a CDN interface 161 for transferring optimized network traffic to the content delivery network.

Further embodiments of the invention may also include out-of-path WAN optimization devices at edge computer locations in the content delivery network. For example, an edge location in the content delivery network near a cloud service may include multiple out-of-path real or virtualized WAN optimization devices or modules. A router or load balancer at the edge location may be used to direct network traffic flows to each of the edge WAN optimization modules, in a similar manner to the example network traffic flows described below.

Figure 2:
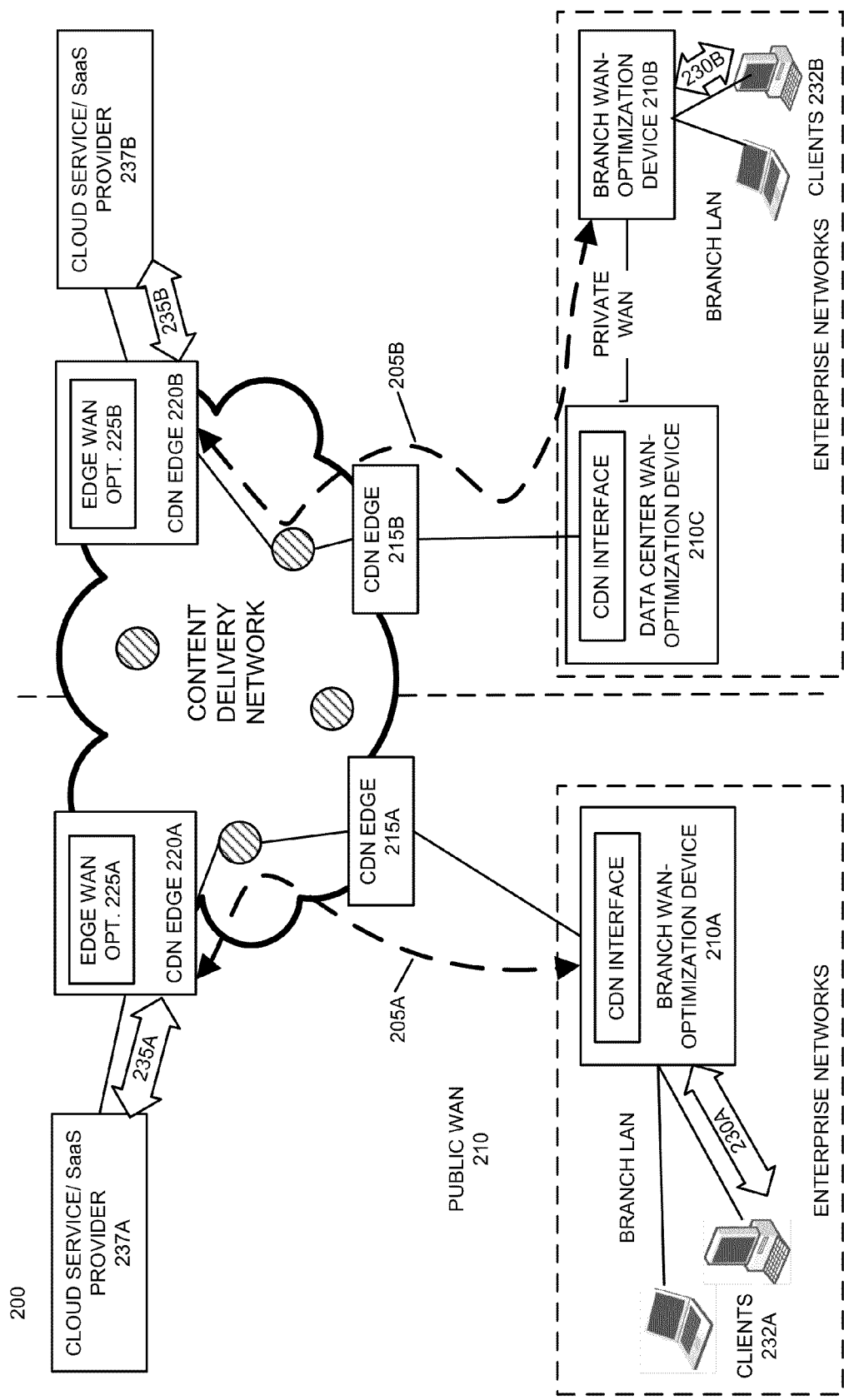
FIG. 2 illustrates example network connections between WAN optimization devices within private networks and the content delivery network according to embodiments of the invention.

FIG. 2 illustrates example network connections between WAN optimization devices within private networks and the content delivery network according to an embodiment of the invention. Example 200 illustrates a direct branch configuration and a backhaul network configuration as described above. When the system is optimizing network traffic between clients and cloud service providers, network connections including an inner connection and a pair of outer connections are formed.

An inner connection includes the one or more network connections between a branch WAN optimization device and an edge WAN optimization device, optionally including a data center device. The inner connection is adapted to carry singly and doubly optimized network traffic through the enterprise network, the public WAN, and the content delivery network.

For example, inner connection 205a carries singly optimized network traffic between branch WAN optimization device 210a and content delivery network edge device 215a. The content delivery network edge device 215a performs a second set of network traffic optimizations and forwards the doubly optimized network traffic over the inner connection 205a to content delivery network edge device 220a and edge WAN optimization network device 225a. In another example, inner connection 205b carries singly optimized network traffic between branch WAN optimization device 210b and content delivery network edge device 215b, passing through data center device 210c. The content delivery network edge device 215b performs a second set of network traffic optimizations and forwards the doubly optimized network traffic over the inner connection 205b to content delivery network edge device 220b and edge WAN optimization network device 225b.

An outer connection includes the one or more network connection carrying non-optimized network traffic. Example outer connections include network connections between client systems 232 and branch WAN optimization devices 210 and network connections between content delivery network edge devices 220 and cloud services and providers 237. From the perspective of the cloud services and providers 237 and client systems 232, the outer connections 230 and 235 appear to be a single logical end-to-end network connection. The inner connections 205 remain hidden to the cloud services and providers 237 and client systems.

In an embodiment, inner connections may be manually created by configuring WAN optimization devices. In other embodiments, WAN optimization devices automatically establish inner connections as needed. For example, one embodiment of the invention uses a branch or data center device to identify an edge WAN optimization device closest to any given cloud service or provider to determine its network address and automatically establish an inner connection between these WAN optimization devices.

Figure 3:
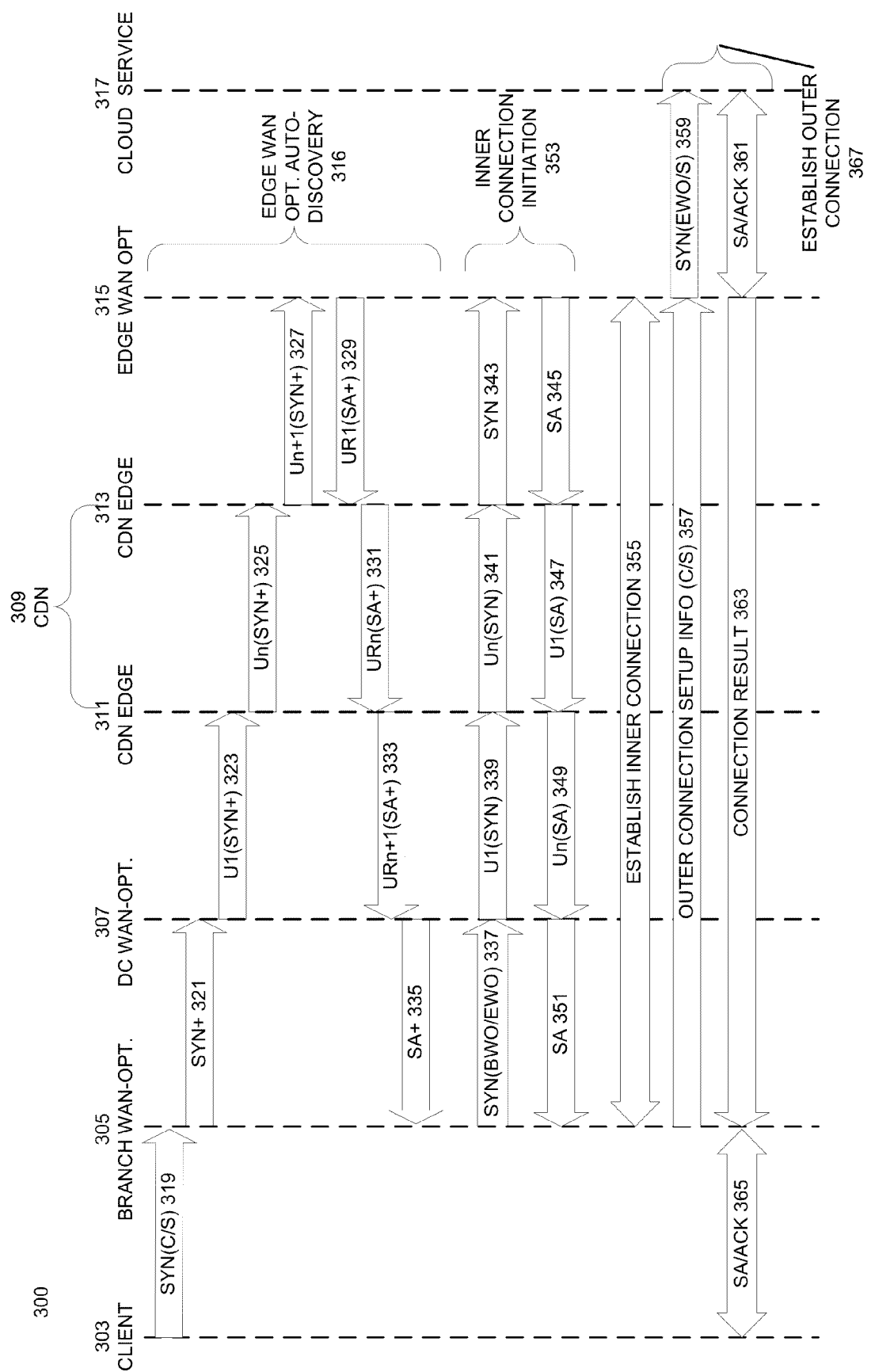
FIG. 3 illustrates example network connection flows for initiating communications between WAN optimization devices over a content delivery network according to an embodiment of the invention.

FIG. 3 illustrates example 300 of network connection flows for initiating communications between WAN optimization modules according to an embodiment of the invention. Example 300 illustrates the process of identifying and establishing an inner connection with the appropriate edge WAN optimization module for network traffic associated with a given cloud service. Example 300 uses the TCP/IP network protocol; however, other embodiments of the invention may employ any other stateful or stateless network protocol known in the art. TCP/IP uses a three-way handshake technique that is also employed by other standard and proprietary communication protocols.

In example 300, a client 303 initiates a connection with a cloud service by sending a first message 319, referred to as a SYN message, addressed to a server 317 associated with the cloud service. SYN message 319 has a source address ("C") of the client 303 and a destination address ("S") of the server 317.

A branch WAN optimization module 305 intercepts SYN message 319. If the destination address matches a network address known by the branch WAN optimization module to be associated with a cloud service to be optimized, then the branch WAN optimization module 305 sends out a corresponding modified SYN message 321. Modified SYN message 321 is similar to SYN message 319 but includes an indicator, referred to as a probe option, to indicate the presence of the branch WAN optimization module 305 to any other intercepting WAN optimization modules. This probe option indicator is included in a portion of the modified SYN message 321 that may be ignored by the cloud service server 317 and other intervening network devices, such as network switches and routers. Modified SYN message 321 may also include information enabling access to a content delivery network 309, such as authentication information, and/or configuring the content delivery network 309 to direct the SYN message 321 and other associated network traffic to the cloud service 317.

If the system is using a backhaul network configuration, as described in FIG. 1A, the modified SYN message 321 may be intercepted by a data center WAN optimization module or other data center module 307 that is adapted to communicate with the content delivery network 309. Data center WAN optimization module 307 prepares the modified SYN message 321 for transport over a content delivery network 309. In an embodiment, data center WAN optimization module 307 encapsulates the modified SYN message 321 in a UDP network message 323. In another embodiment, the modified SYN message 321 may be encapsulated in a TCP message or using any other network protocol to facilitate passage through network firewalls. In a further embodiment, the encapsulating UDP, TCP, or other network protocol message 323 includes information enabling access to a content delivery network 309, such as authentication information, and/or configuring the content delivery network 309 to direct the message 323 and other associated network traffic to the cloud service 317.

Both branch and data center WAN optimization modules 305 and 307 may be implemented as a physical network device and/or as software executed natively or within a virtual machine application on a computer system, alone or in parallel with other software processes (potentially including other software WAN optimization modules).

UDP message 323 encapsulating the modified SYN message and optionally additional information travels over a public or private WAN to a nearby (in terms of network topology) edge computer 311 of the content delivery network 309. This first edge computer 311 may examine the UDP message 323 for authentication and/or configuration information. Edge computer 311 optimizes received network traffic for transport over the content delivery network 309. For example, edge computer 311 as well as other nodes of the content delivery network 309 may utilize enhanced network routing and TCP protocol optimization to efficiently communicate network traffic over the content delivery network 309.

Edge computer 311 outputs encapsulating message 325 to communicate the modified SYN message over the content delivery network 309. Encapsulating message 325 may travel through multiple nodes or locations in the content delivery network 309 before reaching a second edge computer 313 nearby (in terms of network topology) the cloud service 317.

Upon receiving an encapsulating message 325 via the content delivery network 309, the second edge computer 313 forwards the encapsulated and modified SYN message to an edge WAN optimization module 315 via message 327. Edge WAN optimization module 315 may be implemented as a physical network device and/or software executed natively or within a virtual machine application on a computer system, alone or in parallel with other software processes (potentially including other software WAN optimization modules).

Edge WAN optimization module 315 accesses the modified SYN message from the encapsulating message and recognizes the indicator and/or other information added by the branch WAN optimization module 305. In response to the modified SYN message, edge WAN optimization module 315 generates an acknowledgement message, such as TCP/IP SYN/ACK message (SA), and includes a flag or indicator identifying the edge WAN optimization module 315 as the WAN optimization module closest to the cloud service 317. Acknowledgement message may also include the network address and port of the edge WAN optimization module 315.

In an embodiment, the edge WAN optimization module 315 encapsulates the acknowledgement message in a UDP message 329 for transport over the content delivery network 309. Edge computer 313 outputs encapsulating message 331 to communicate the acknowledgement message over the content delivery network 309. Encapsulating message 331 may travel through multiple nodes or locations in the content delivery network 309 before exiting the content delivery network 309 as message 333 and reaching the data center WAN optimization module 307.

The data center WAN optimization module 307 extracts the acknowledgement message from the encapsulated acknowledgement message 333 and forwards acknowledgement message 335, including the indicator identifying the edge WAN optimization module 315, to the branch WAN optimization module 305. The acknowledgement message 335 may also include the network address and port of the edge WAN optimization module 315.

Messages 321 to 335 comprise an edge WAN optimization auto-discovery sequence 316, in which the branch WAN optimization module 305 discovers the identity and network location of the edge WAN optimization module 315 closest to the cloud service 317. Following the receipt of acknowledgement message 335, the branch WAN optimization module 305 has identified the edge WAN optimization module 315 closest to the cloud service 317. The branch WAN optimization module 305 may then initiate an inner connection with the identified edge WAN optimization module 315 using message sequence 353.

The inner connection initiation sequence 353 begins with the branch WAN optimization module 305 sending a connection initiation message 337, such as a TCP/IP SYN message, to the edge WAN optimization module 315. Unlike the prior SYN message 321, SYN message 337 has a source address ("BWO") of the branch WAN optimization module 305 and a destination address ("EWO") of the edge WAN optimization module 315. SYN message 337 may also include information identifying the branch WAN optimization device, the client 303, the cloud service 317, and/or any other information for optimizing network traffic between client 303 and cloud service 317.

SYN message 337 is intercepted by data center WAN optimization module 307, which encapsulates this message in a UDP or other protocol message 339 for transport to and over the content delivery network 309. Encapsulating message 339 may also include authentication and/or configuration information needed to access the content delivery network 309.

UDP message 339 encapsulating the SYN message 337 and optionally additional information travels over a public or private WAN to a nearby (in terms of network topology) edge computer 311 of the content delivery network 309. This first edge computer 311 may examine the UDP message 339 for authentication and/or configuration information and optimizes it for transport over the content delivery network 309.

Edge computer 311 outputs encapsulating message 341 to communicate the SYN message 337 over the content delivery network 309. Encapsulating message 341 may travel through multiple nodes or locations in the content delivery network 309 before reaching the second edge computer 313 nearby (in terms of network topology) the cloud service 317. The second edge computer 313 extracts the SYN message 337 from the encapsulated message 341 and forwards it to edge WAN optimization module 315 via message 343.

In response, edge WAN optimization module returns a connection acknowledgement message, such as a TCP/IP SYN/ACK (SA) message 345, to the branch WAN optimization module. SYN/ACK message 345 is encapsulated by edge computer system 313 into message 347 for transport over the content delivery network 309 and into message 349 for transport from the first edge computer 311 to the data center WAN optimization module 307. The data center WAN optimization module 307 extracts the SYN/ACK message 345 from the encapsulated message 349 and forwards it to branch WAN optimization module 305 via message 351.

At this point, the branch 305 and edge 315 WAN optimization modules have established an inner connection 355 and may use this connection to exchange optimized network traffic and control information.

Once the inner connection 335 has been established between the branch 305 and edge 315 WAN optimization modules, these WAN optimization modules initiate outer connections between the client 303 and the branch WAN optimization module 305 and between the edge WAN optimization module 315 and cloud service 317 using sequence 367. In an embodiment, the branch WAN optimization module 305 sends outer connection setup information 357 via its inner connection to the edge WAN optimization module 315. The edge WAN optimization module 315 then generates and sends a connection initiation message, such as a TCP/IP SYN message 359, to the cloud service 317. SYN message 359 includes a source address ("EWO") of the edge WAN optimization module 315 and a destination address ("S") of the cloud service 317. Message 359 is followed by connection acknowledgement messages between the cloud service 317 and the edge WAN optimization module 315, such as a TCP/IP SYN/ACK (SA) message and a response ACK message 361. This establishes the portion of the outer connection between the edge WAN optimization module 315 and the cloud service 317. The edge WAN optimization module 315 then communicates this result 363 via the inner channel to the branch WAN optimization module 305. Branch WAN optimization module 305 then sends an acknowledgement message, such as TCP/IP SYN/ACK message 365, back to the client 303, which completes the establishment of the outer connection. SYN/ACK message 365 is the acknowledgment message corresponding with the client's 303 initial connection request message 319.

From the view of the client 303, it is communicating directly with the cloud service 317 via this connection. However, the branch WAN optimization module 305 intercepts all network traffic associated with this outer connection for optimization and transport over the inner connection 355 to the edge WAN optimization module 315. The edge WAN optimization module 315 reconstructs the original network traffic from the client 303 and forwards it to the cloud service 317. From the perspective of the cloud service 317, the client appears to be located at the second edge computer 313 of the content delivery network 309. The edge WAN optimization module 315 may also generate additional network traffic and send it to the cloud service 317 to prefetch data or optimize performance.

As described above, embodiments of the invention may omit a separate data center WAN optimization module and use a branch WAN optimization module to interface with the content delivery network. In these embodiments, the example network connection flows 300 are modified so that branch WAN optimization module 305 sends and receives all content delivery network 309 related messages, such as receiving messages 333, 349, 355, and 363 and outputting messages 323, 339, 357, and 365. Messages 321, 335, 337, and 351 are omitted in these embodiments of network connection flow 300.

Figure 4A:
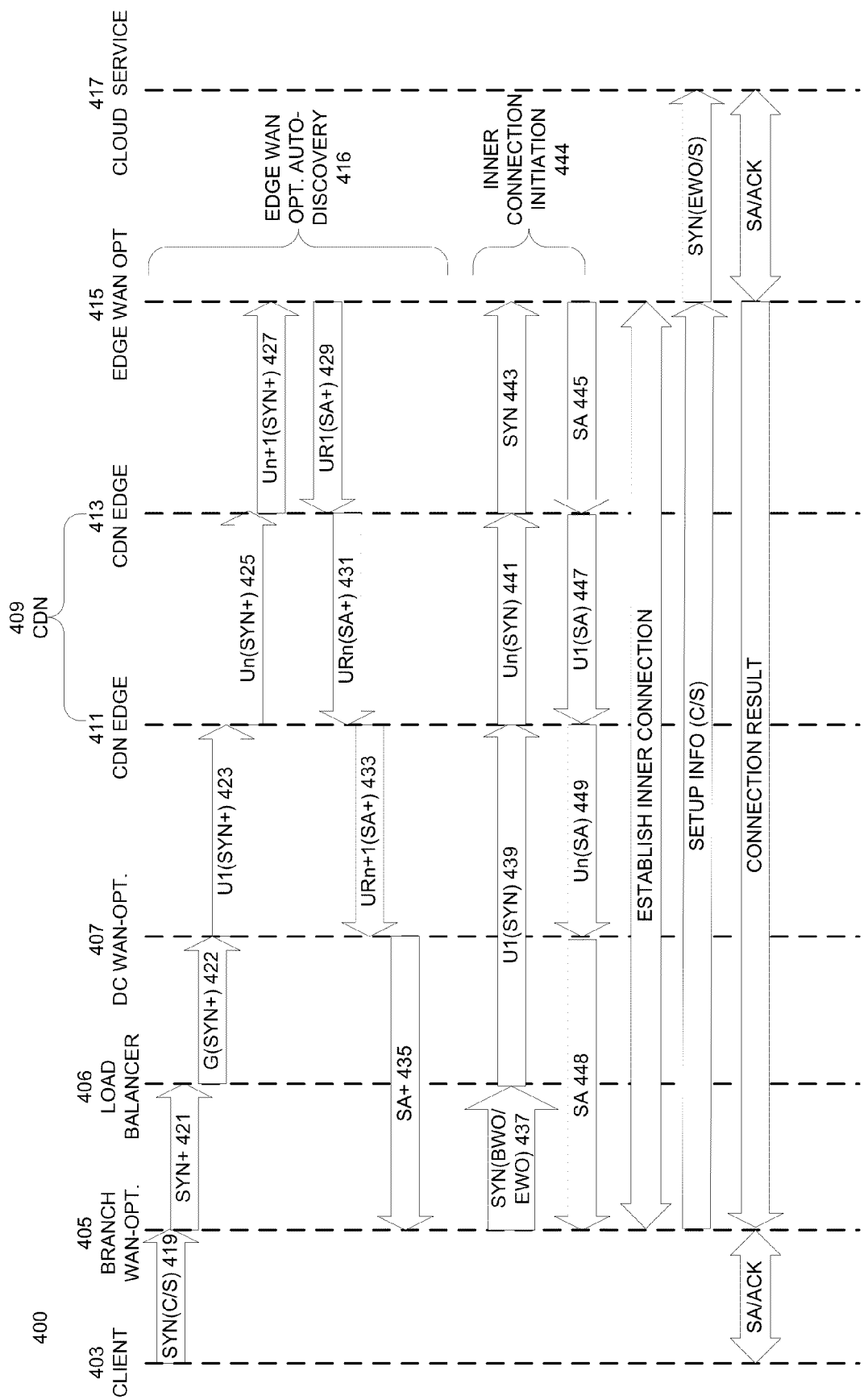
FIGS. 4A-4B illustrate additional example network connection flows for initiating communications between WAN optimization devices over content delivery networks according to embodiments of the invention.
Figure 4B:
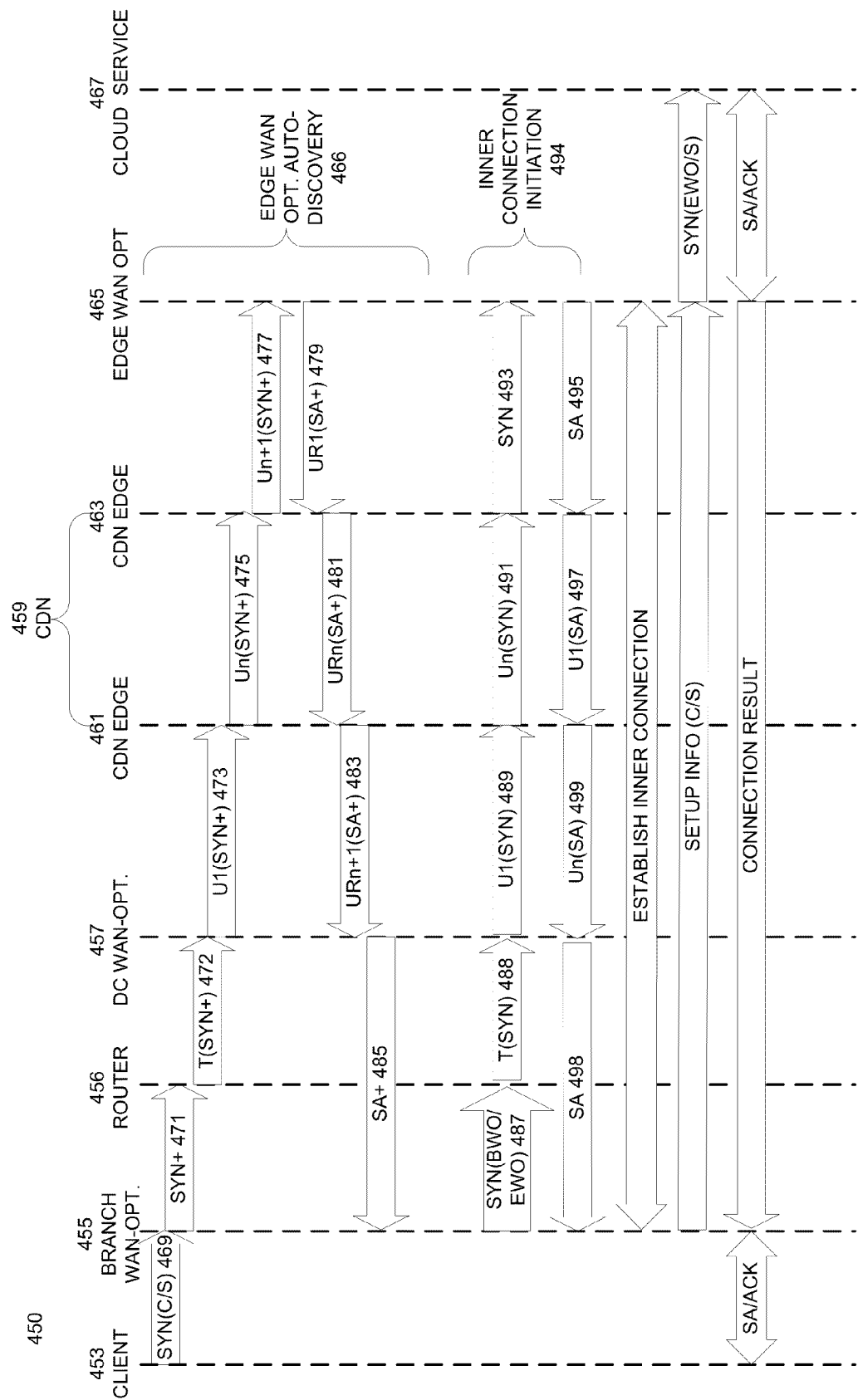

FIGS. 4A-4B illustrate additional example network connection flows for initiating communications between WAN optimization devices over content delivery networks according to embodiments of the invention. FIG. 4A illustrates an example 400 of network connection flows for initiating communications between WAN optimization modules in conjunction with a load balancer according to an embodiment of the invention. Example 400 illustrates the process of identifying and establishing an inner connection with the appropriate edge WAN optimization module for network traffic associated with a given cloud service. Example 400 uses the TCP/IP network protocol; however, other embodiments of the invention may employ any other stateful or stateless network protocol known in the art. TCP/IP uses a three-way handshake technique that is also employed by other standard and proprietary communication protocols.

In example 400, a client 403 initiates a connection with a cloud service by sending a first SYN message 419 addressed to a server 417 associated with the cloud service. SYN message 419 has a source address ("C") of the client 403 and a destination address ("S") of the server 417.

A branch WAN optimization module 405 intercepts SYN message 419. If the destination address matches a network address known by the branch WAN optimization module to be associated with a cloud service to be optimized, then the branch WAN optimization module 405 sends out a corresponding modified SYN message 421. Modified SYN message 421 is similar to SYN message 419 but includes an indicator, referred to as a probe option, to indicate the presence of the branch WAN optimization module 405 to any other intercepting WAN optimization modules. This probe option indicator is included in a portion of the modified SYN message 421 that may be ignored by the cloud service server 417 and other intervening network devices, such as network switches and routers. Modified SYN message 421 may also include information enabling access to a content delivery network 409, such as authentication information, and/or configuring the content delivery network 409 to direct the SYN message 421 and other associated network traffic to the cloud service 417.

In example 400, the modified SYN message 421 is intercepted by a load balancer 406. Load balancer 406 selects one of a plurality of data center WAN optimization modules or other data center modules to handle this network traffic flow between client 304 and cloud service 417. Load balancer 406 then encapsulates the modified SYN message 421 in another message, such as GRE tunnel message 422, and forwards it to the selected data center WAN optimization module 407.

Data center WAN optimization module 407 receives the encapsulating message 422 and prepares the modified SYN message 421 for transport over a content delivery network 409. In an embodiment, data center WAN optimization module 407 encapsulates the modified SYN message 421 in a UDP network message 423. In a further embodiment, the encapsulating UDP message 423 includes information enabling access to a content delivery network 409, such as authentication information, and/or configuring the content delivery network 409 to direct the message 423 and other associated network traffic to the cloud service 417.

Both branch and data center WAN optimization modules 405 and 407 may be implemented as a physical network device and/or as software executed natively or within a virtual machine application on a computer system, alone or in parallel with other software processes (potentially including other software WAN optimization modules).

UDP message 423 encapsulating the modified SYN message and optionally additional information travels over a public or private WAN to a nearby (in terms of network topology) edge computer 411 of the content delivery network 409. This first edge computer 411 may examine the UDP message 423 for authentication and/or configuration information. Edge computer 411 optimizes received network traffic for transport over the content delivery network 409. For example, edge computer 411 as well as other nodes of the content delivery network 409 may utilize enhanced network routing and TCP protocol optimization to efficiently communicate network traffic over the content delivery network 409.

Edge computer 411 outputs encapsulating message 425 to communicate the modified SYN message over the content delivery network 409. Encapsulating message 425 may travel through multiple nodes or locations in the content delivery network 409 before reaching a second edge computer 413 nearby (in terms of network topology) the cloud service 417.

Upon receiving an encapsulating message 425 via the content delivery network 409, the second edge computer 413 forwards the encapsulated and modified SYN message to an edge WAN optimization module 415 via message 427. Edge WAN optimization module 415 may be implemented as a physical network device and/or software executed natively or within a virtual machine application on a computer system, alone or in parallel with other software processes (potentially including other software WAN optimization modules).

Edge WAN optimization module 415 accesses the modified SYN message from the encapsulating message and recognizes the indicator and/or other information added by the branch WAN optimization module 405. In response to the modified SYN message, edge WAN optimization module 415 generates an acknowledgement message, such as TCP/IP SYN/ACK message (SA), and includes a flag or indicator identifying the edge WAN optimization module 415 as the WAN optimization module closest to the cloud service 417. Acknowledgement message may also include the network address and port of the edge WAN optimization module 415.

In an embodiment, the edge WAN optimization module 415 encapsulates the acknowledgement message in a UDP message 429 for transport over the content delivery network 409. Edge computer 413 outputs encapsulating message 431 to communicate the acknowledgement message over the content delivery network 409. Encapsulating message 431 may travel through multiple nodes or locations in the content delivery network 409 before exiting the content delivery network 409 as message 433 and reaching the data center WAN optimization module 407.

The data center WAN optimization module 407 extracts the acknowledgement message from the encapsulated acknowledgement message 433 and forwards the extracted acknowledgement message 435, including the indicator identifying the edge WAN optimization module 415, to the branch WAN optimization module 405. The acknowledgement message 435 may also include the network address and port of the edge WAN optimization module 415.

Messages 421 to 435 comprise an edge WAN optimization auto-discovery sequence 416, in which the branch WAN optimization module 405 discovers the identity and network location of the edge WAN optimization module 415 closest to the cloud service 417. Following the receipt of acknowledgement message 435, the branch WAN optimization module 405 has identified the edge WAN optimization module 415 closest to the cloud service 417. The branch WAN optimization module 405 may then initiate an inner connection with the identified edge WAN optimization module 415 using message sequence 453.

The inner connection initiation sequence 444 begins with the branch WAN optimization module 405 sending a connection initiation message 437, such as a TCP/IP SYN message, to the edge WAN optimization module 415. Unlike the prior SYN message 421, SYN message 437 has a source address ("BWO") of the branch WAN optimization module 405 and a destination address ("EWO") of the edge WAN optimization module 415. SYN message 437 may also include information identifying the branch WAN optimization device, the client 403, the cloud service 417, and/or any other information for optimizing network traffic between client 403 and cloud service 417.

In an embodiment, SYN message 437 is intercepted by load balancer 406, which encapsulates this message in a UDP or other protocol message 439 for transport to and over the content delivery network 409. Encapsulating message 439 may also include authentication and/or configuration information needed to access the content delivery network 409. In an alternate embodiment, the load balancer 406 redirects SYN message 427 to the data center WAN optimization device or other content delivery network interface device for encapsulation.

UDP message 439 encapsulating the SYN message 437 and optionally additional information travels over a public or private WAN to a nearby (in terms of network topology) edge computer 411 of the content delivery network 409. This first edge computer 411 may examine the UDP message 439 for authentication and/or configuration information and optimizes it for transport over the content delivery network 409.

Edge computer 411 outputs encapsulating message 441 to communicate the SYN message 437 over the content delivery network 409. Encapsulating message 441 may travel through multiple nodes or locations in the content delivery network 409 before reaching the second edge computer 413 nearby (in terms of network topology) the cloud service 417. The second edge computer 413 extracts the SYN message 437 from the encapsulated message 441 and forwards it to edge WAN optimization module 415 via message 443.

In response, edge WAN optimization module returns a connection acknowledgement message, such as a TCP/IP SYN/ACK (SA) message 445, to the branch WAN optimization module. SYN/ACK message 445 is encapsulated by edge computer system 413 into message 447 for transport over the content delivery network 409 and into message 449 for transport from the first edge computer 411 to the data center WAN optimization module 407. The data center WAN optimization module 407 extracts the SYN/ACK message 445 from the encapsulated message 449 and forwards it to branch WAN optimization module 405 via message 448.

At this point, the branch 405 and edge 415 WAN optimization modules have established an inner connection and may use this connection to exchange optimized network traffic and control information. The branch 405 and edge 415 WAN optimization modules may establish the inner connection, exchange outer connection setup information, and establish the outer connections in a manner similar to that described in example 300.

The example 400 of network connection flows establishes inner and outer network connections in a backhaul network configuration. In a further embodiment, a similar sequence of network connection flows may be used in a direct branch configuration. In this embodiment, client network traffic is intercepted by a load balancer and redirected to one of a plurality of branch WAN optimization modules.

Similarly, FIG. 4B illustrates an example 450 of network connection flows for initiating communications between WAN optimization modules in conjunction with a router redirecting network traffic according to an embodiment of the invention. Example 450 illustrates the process of identifying and establishing an inner connection with the appropriate edge WAN optimization module for network traffic associated with a given cloud service. Example 450 uses the TCP/IP network protocol; however, other embodiments of the invention may employ any other stateful or stateless network protocol known in the art. TCP/IP uses a three-way handshake technique that is also employed by other standard and proprietary communication protocols.

In example 450, a client 453 initiates a connection with a cloud service by sending a first SYN message 469 addressed to a server 467 associated with the cloud service. SYN message 469 has a source address ("C") of the client 453 and a destination address ("S") of the server 467.

A branch WAN optimization module 455 intercepts SYN message 469. If the destination address matches a network address known by the branch WAN optimization module to be associated with a cloud service to be optimized, then the branch WAN optimization module 455 sends out a corresponding modified SYN message 471. Modified SYN message 471 is similar to SYN message 469 but includes an indicator, referred to as a probe option, to indicate the presence of the branch WAN optimization module 455 to any other intercepting WAN optimization modules. This probe option indicator is included in a portion of the modified SYN message 471 that may be ignored by the cloud service server 467 and other intervening network modules, such as network switches and routers. Modified SYN message 471 may also include information enabling access to a content delivery network 459, such as authentication information, and/or configuring the content delivery network 459 to direct the SYN message 471 and other associated network traffic to the cloud service 467.

In example 450, the modified SYN message 471 is intercepted by a router 456. Router 456 is configured to redirect some or all of the network traffic from clients 453 to one or more WAN optimization modules or other data center devices, such as data center WAN optimization module 457. If the router 456 is configured to use a traffic routing protocol such as WCCP, the router 456 may redirect each network traffic flow to a selected one of two or more WAN optimization modules. If the router 456 uses policy-based redirection, then there may only be a single data center WAN optimization module 456.

Router 456 encapsulates or redirects the modified SYN message 472 to communicate it with the data center WAN optimization module 457. Data center WAN optimization module 457 receives the message 472 and prepares it for transport over a content delivery network 459. In an embodiment, data center WAN optimization module 457 encapsulates message 472 in a UDP network message 473. In a further embodiment, the encapsulating UDP message 473 includes information enabling access to a content delivery network 459, such as authentication information, and/or configuring the content delivery network 459 to direct the message 473 and other associated network traffic to the cloud service 467.

Both branch and data center WAN optimization modules 455 and 457 may be implemented as a physical network module and/or as software executed natively or within a virtual machine application on a computer system, alone or in parallel with other software processes (potentially including other software WAN optimization modules).

UDP message 473 encapsulating the modified SYN message and optionally additional information travels over a public or private WAN to a nearby (in terms of network topology) edge computer 461 of the content delivery network 459. This first edge computer 461 may examine the UDP message 473 for authentication and/or configuration information. Edge computer 461 optimizes received network traffic for transport over the content delivery network 459. For example, edge computer 461 as well as other nodes of the content delivery network 459 may utilize enhanced network routing and TCP protocol optimization to efficiently communicate network traffic over the content delivery network 459.

Edge computer 461 outputs encapsulating message 475 to communicate the modified SYN message over the content delivery network 459. Encapsulating message 475 may travel through multiple nodes or locations in the content delivery network 459 before reaching a second edge computer 463 nearby (in terms of network topology) the cloud service 467.

Upon receiving an encapsulating message 475 via the content delivery network 459, the second edge computer 463 forwards the encapsulated and modified SYN message to an edge WAN optimization module 465 via message 477. Edge WAN optimization module 465 may be implemented as a physical network module and/or software executed natively or within a virtual machine application on a computer system, alone or in parallel with other software processes (potentially including other software WAN optimization modules).

Edge WAN optimization module 465 accesses the modified SYN message from the encapsulating message and recognizes the indicator and/or other information added by the branch WAN optimization module 455. In response to the modified SYN message, edge WAN optimization module 465 generates an acknowledgement message, such as TCP/IP SYN/ACK message (SA), and includes a flag or indicator identifying the edge WAN optimization module 465 as the WAN optimization module closest to the cloud service 467. Acknowledgement message may also include the network address and port of the edge WAN optimization module 465.

In an embodiment, the edge WAN optimization module 465 encapsulates the acknowledgement message in a UDP message 479 for transport over the content delivery network 459. Edge computer 463 outputs encapsulating message 481 to communicate the acknowledgement message over the content delivery network 459. Encapsulating message 481 may travel through multiple nodes or locations in the content delivery network 459 before exiting the content delivery network 459 as message 483 and reaching the data center WAN optimization module 457.

The data center WAN optimization module 457 extracts the acknowledgement message from the encapsulated acknowledgement message 483 and forwards the extracted acknowledgement message 485, including the indicator identifying the edge WAN optimization module 465, to the branch WAN optimization module 455. The acknowledgement message 485 may also include the network address and port of the edge WAN optimization module 465.

Messages 471 to 485 comprise an edge WAN optimization auto-discovery sequence 466, in which the branch WAN optimization module 455 discovers the identity and network location of the edge WAN optimization module 465 closest to the cloud service 467. Following the receipt of acknowledgement message 485, the branch WAN optimization module 455 has identified the edge WAN optimization module 465 closest to the cloud service 467. The branch WAN optimization module 455 may then initiate an inner connection with the identified edge WAN optimization module 465 using message sequence 453.

The inner connection initiation sequence 494 begins with the branch WAN optimization module 455 sending a connection initiation message 487, such as a TCP/IP SYN message, to the edge WAN optimization module 465. Unlike the prior SYN message 471, SYN message 487 has a source address ("BWO") of the branch WAN optimization module 455 and a destination address ("EWO") of the edge WAN optimization module 465. SYN message 487 may also include information identifying the branch WAN optimization device, the client 453, the cloud service 467, and/or any other information for optimizing network traffic between client 453 and cloud service 467.

SYN message 487 is intercepted by router 456 and redirected to the data center WAN optimization module 457. Data center WAN optimization module 457 encapsulates this message in a UDP or other protocol message 489 for transport to and over the content delivery network 459. Encapsulating message 489 may also include authentication and/or configuration information needed to access the content delivery network 459.

UDP message 489 encapsulating the SYN message 487 and optionally additional information travels over a public or private WAN to a nearby (in terms of network topology) edge computer 461 of the content delivery network 459. This first edge computer 461 may examine the UDP message 489 for authentication and/or configuration information and optimizes it for transport over the content delivery network 459.

Edge computer 461 outputs encapsulating message 491 to communicate the SYN message 487 over the content delivery network 459. Encapsulating message 491 may travel through multiple nodes or locations in the content delivery network 459 before reaching the second edge computer 463 nearby (in terms of network topology) the cloud service 467. The second edge computer 463 extracts the SYN message 487 from the encapsulated message 491 and forwards it to edge WAN optimization module 465 via message 493.

In response, edge WAN optimization module returns a connection acknowledgement message, such as a TCP/IP SYN/ACK (SA) message 495, to the branch WAN optimization module. SYN/ACK message 495 is encapsulated by edge computer system 463 into message 497 for transport over the content delivery network 459 and into message 499 for transport from the first edge computer 461 to the data center WAN optimization module 457. The data center WAN optimization module 457 extracts the SYN/ACK message 495 from the encapsulated message 499 and forwards it to branch WAN optimization module 455 via message 498.

At this point, the branch 455 and edge 465 WAN optimization modules have established an inner connection and may use this connection to exchange optimized network traffic and control information. The branch 455 and edge 465 WAN optimization modules may establish the inner connection, exchange outer connection setup information, and establish the outer connections in a manner similar to that described in example 300.

Figure 5:
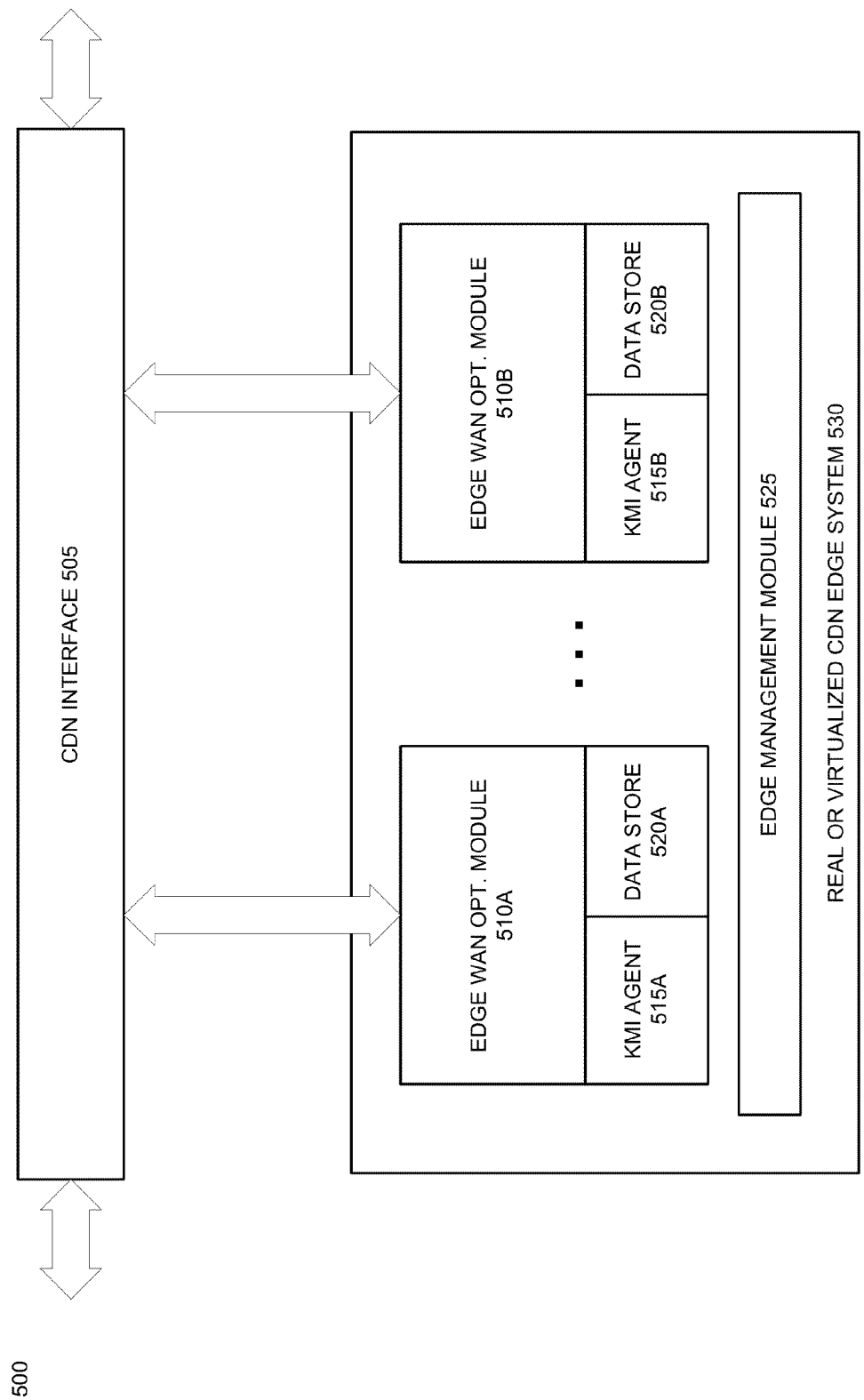
FIG. 5 illustrates an example system architecture for WAN optimization at edge locations of a content delivery network according to an embodiment of the invention.

FIG. 5 illustrates an example system architecture 500 for WAN optimization at edge locations of a content delivery network according to an embodiment of the invention. Example system architecture 500 may be implemented within a real or virtualized content delivery network edge system 530. System architecture 500 includes a content delivery network interface 505 for sending and receiving network traffic via the content delivery network. Additionally, an embodiment of the content delivery network interface 505 includes logic for authenticating network traffic from branch and data center WAN optimization modules to enable this network traffic to travel via the content delivery network. In a further embodiment, content delivery network interface 505 includes other logic for additionally optimizing and efficiently directing network traffic over the content delivery network. For example, content delivery network interface 505 may encapsulate network traffic from outside the content delivery network for transport over the content delivery network and extract network traffic from encapsulating messages received from the content delivery network for processing by edge WAN optimization modules.

In this embodiment, the real or virtualized content delivery network edge system 530 also includes one or more edge WAN optimization modules 510, such as edge WAN optimization modules 510A and 510B. Each of the edge WAN optimization modules 510 is capable of receiving optimized network traffic over the content delivery network and reconstructing the original network traffic as sent by one or clients. Similarly, each of the edge WAN optimization modules 510 are capable of receiving network traffic from cloud services and applying WAN optimization techniques to this network traffic. This singly optimized network traffic is then further encapsulated and optimized by the content delivery network interface 505 and/or other components of the content delivery network edge system 530 for transport over the content delivery network to branch and/or data center WAN optimization modules and eventually to clients. In an embodiment, each of the edge WAN optimization modules 510 is capable of handling multiple types of network traffic from multiple clients and cloud services. Furthermore, the edge WAN optimization modules 510 may operate in parallel as separate applications, processes, and/or virtual machines or devices.

In an embodiment, the content delivery network edge system 530 also includes one or more key management (KMI) agents 515, such as KMI agents 515A and 515B. As described above, network security may be maintained by installing additional security certificates, such as SSL certificates, on the WAN optimization modules. These security certificates enable the cloud services and clients to establish secure outer connections with their respective nearby WAN optimization modules. Network security techniques adapted to WAN optimization applications, such as split-SSL terminations, may be utilized for this embodiment. In an embodiment, the key management agents 515 access the configuration portal and optionally other security entities, such as certificate authorities, to retrieve any necessary security certificates and/or keys. The key management agents 515 provide these security certificates, keys, or other security information to the edge WAN optimization modules 510 as needed to assist them in establishing secure inner and outer connections.

WAN optimization techniques may include predicting and prefetching network traffic and data likely to be sent or received by clients. Edge WAN optimization modules 510 use data stores 520, including data stores 520A and 520B, to store prefetched or frequently repeated portions of data. Edge WAN optimization modules 510 use the portions of data stored in data stores 520 to optimize network traffic from cloud services and to reconstruct the original network traffic from clients and directed to cloud services. Embodiments of data stores 520 may include internal data storage, external data storage, and/or networked data storage. In one implementation, WAN optimization modules at the edge and within organization networks partition incoming network traffic into segments. Optimized network traffic includes non-redundant segments as well as segments likely to be required in the future. Segments are prefetched and stored in advance of potential demand in data stores 520.

An edge management module 525 manages the configuration, deployment, and operation of one or more edge WAN optimization modules 510 within the content delivery network edge system 530. In an embodiment, edge management module 525 may dynamically instantiate and de-instantiate edge WAN optimization modules 510 as needed depending on network traffic demands and the capabilities of the content delivery network edge system 530.

Figure 6:
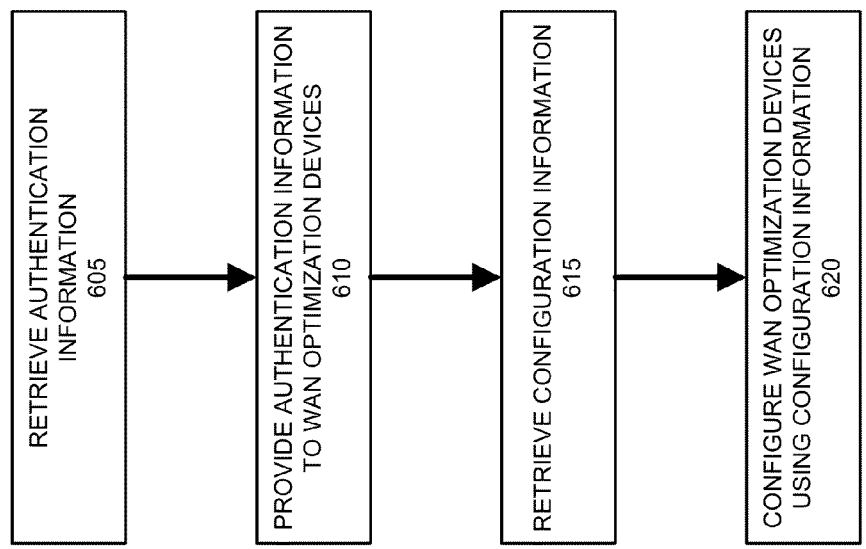
FIG. 6 illustrates a method of providing authentication and configuration information to WAN optimization devices or modules according to an embodiment of invention.

As described above, the licensing and configuration portal(s) are used to configure branch and optional data center WAN optimization modules to intercept, optimize, and transport network traffic over a content delivery network to one or more cloud services. FIG. 6 illustrates a method 600 of providing authentication and configuration information to WAN optimization devices or modules according to an embodiment of invention.

Step 605 retrieves authentication information. In an embodiment, an administrative user contacts a licensing and/or configuration portal using an administrative application. The administrative application may be implemented using one or more web pages provided by a web server. The administrative user requests content delivery network access for one or more WAN optimization devices or modules under his or her supervision. Access to the content delivery network may be provided based on a variety of different criteria, including for specific WAN-optimization devices, for specific enterprises or organizations, for specific network protocols, for specific user applications, and/or for specific cloud services. In an embodiment, the administrative user may purchase, rent, or otherwise license content delivery network access based on desired criteria as part of the request for content delivery network access.

In response to an administrative user request for content delivery network access (and optionally following completion of a transaction to purchase, rent, or license this access), the licensing and/or configuration portal provides authentication information to the administrative application and/or the administrative user. In an embodiment, authentication information may be in the form of any type of security credential or secure identifier. In a further embodiment, the authentication information includes an authentication token that may be presented to a content delivery network edge computer to allow network traffic to travel via the content delivery network.

Step 610 distributes the authentication information to one or more WAN optimization devices or modules. In an embodiment, an administrative user directs the administrative application to distribute the authentication information to one or more WAN optimization devices or modules.

Step 615 retrieves configuration information. As described above, WAN optimization devices may be configured to optimize network traffic for specific network protocols, for specific user applications, and/or for specific cloud services. In an embodiment, configuration information enables WAN optimization devices to identify the network traffic that should be optimized in conjunction with the content delivery network. For example, configuration information may specify network protocols, source or destination network addresses or domain names, and/or contents of network traffic that should be optimized in conjunction with the content delivery network.

In a further embodiment, configuration information may also specify optimization parameters used to control the types of optimization techniques to be applied to the network traffic. Different optimizations, such as different types of data compression, application and protocol streamlining, and data prefetching, may be used for each network traffic flow processed by the WAN optimization device.

Step 620 configures the WAN optimization devices using the configuration information. In an embodiment, an administrative application automatically forwards configuration information to the appropriate WAN optimization devices based on the distribution of authentication information. In response to this authentication and configuration information, the branch or data center device configures itself to intercept and optimize the network traffic corresponding with the network protocols, types of network traffic, applications, and/or cloud computing systems to be optimized.

Figure 7:
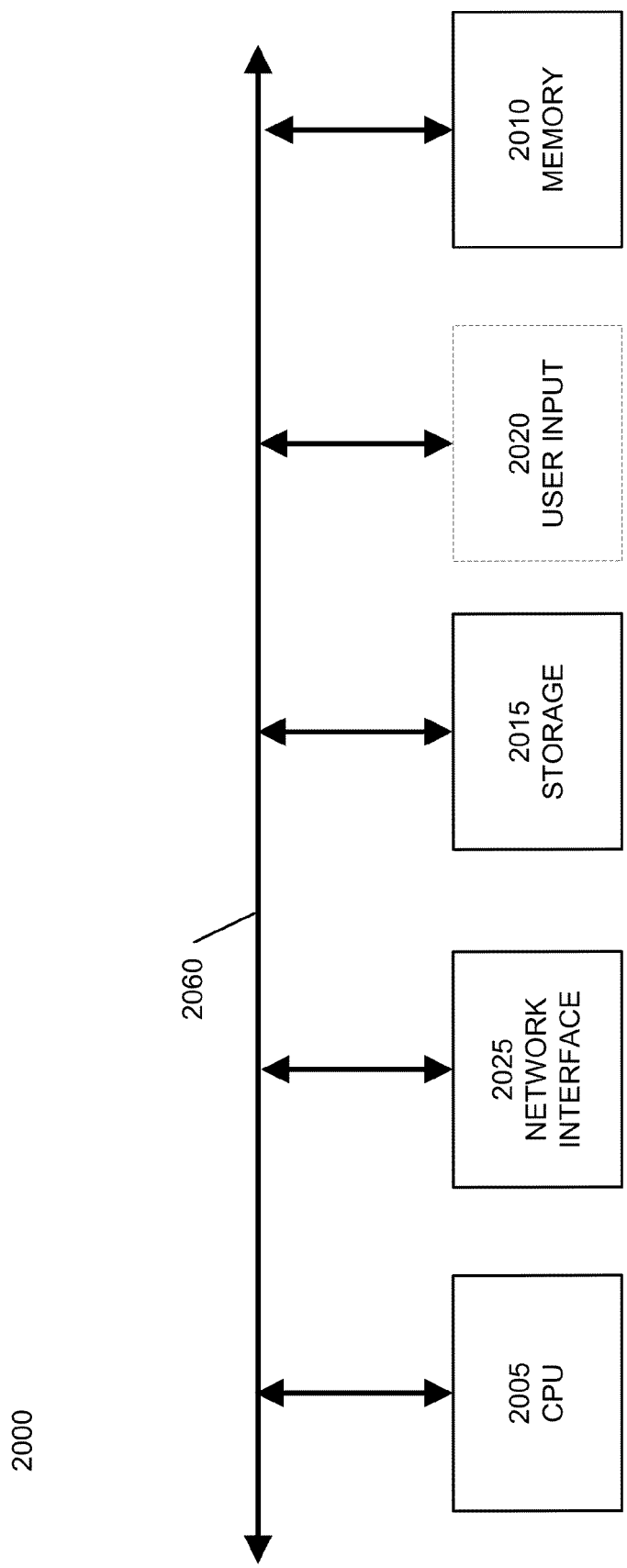
FIG. 7 illustrates an example computer system capable of implementing a WAN optimization device according to an embodiment of the invention.

FIG. 7 illustrates an example computer system 2000 capable of implementing a WAN optimization device according to an embodiment of the invention. FIG. 7 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, WAN and LAN network traffic optimizers and accelerators, network attached storage devices, storage array network interfaces, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices.

In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include one or more wired networking interfaces, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of accessing multiple network traffic optimization systems, the method comprising:
   configuring a first network traffic optimization system to intercept and optimize first network traffic, wherein optimizing the first network traffic produces first optimized network traffic, and wherein the first network traffic optimization system includes multiple wide-area network (WAN) optimization devices for optimizing the first network traffic;
   receiving authentication information from a configuration portal, wherein the authentication information is required to access a second network traffic optimization system that includes a content delivery network, wherein the content delivery network includes multiple edge devices;
   providing the authentication information to the second network traffic optimization system, wherein providing the authentication information comprises:
      associating an authentication token with the first optimized network traffic, and
      communicating the authentication token and the first optimized network traffic to the second network traffic optimization system, wherein communicating the authentication token and the first optimized network traffic includes encapsulating a first message of the first optimized network traffic with the authentication token in a combined message; and
   configuring the second network traffic optimization system to further optimize the first optimized network traffic that is received from the first network traffic optimization system.

2. The method of claim 1, wherein the authentication information is received from the configuration portal in response to a licensing transaction with a user of the first network traffic optimization system.

3. The method of claim 1, wherein configuring the first network traffic optimization system comprises:
   receiving configuration information from the configuration portal; and
   configuring at least one entity in the first network traffic optimization system using the configuration information.

4. The method of claim 3, wherein the configuration information is received in conjunction with the authentication information.

5. The method of claim 3, wherein the configuration information identifies the first network traffic.

6. The method of claim 5, wherein the first network traffic is identified by a destination network address.

7. The method of claim 6, wherein the destination network address is identified by a DNS lookup of at least one domain name included in the configuration information.

8. The method of claim 3, wherein the configuration information specifies an optimization type.

9. The method of claim 8, wherein the optimization type includes at least one of data compression, data prefetching, network protocol streamlining, application-level streamlining, and speculative generation of additional network traffic.

10. The method of claim 3, wherein the configuration information is based on an optimization capability associated with the licensing transaction.

11. The method of claim 10, wherein the licensing transaction is associated with a network protocol.

12. The method of claim 10, wherein the licensing transaction is associated with a software application.

13. The method of claim 10, wherein the licensing transaction is associated with a cloud service provider.

14. The method of claim 1, wherein the first network traffic optimization system includes at least one WAN optimization device.

15. A non-transitory computer-readable storage medium storing instructions that, when executed by a computer, cause the computer to perform a method of accessing multiple network traffic optimization systems, the method comprising:
    configuring a first network traffic optimization system to intercept and optimize first network traffic, wherein optimizing the first network traffic produces first optimized network traffic, and wherein the first network traffic optimization system includes multiple wide-area network (WAN) optimization devices for optimizing the first network traffic;
    receiving authentication information from a configuration portal, wherein the authentication information is required to access a second network traffic optimization system that includes a content delivery network, wherein the content delivery network includes multiple edge devices;
    providing the authentication information to the second network traffic optimization system, wherein providing the authentication information comprises:
        associating an authentication token with the first optimized network traffic, and
        communicating the authentication token and the first optimized network traffic to the second network traffic optimization system, wherein communicating the authentication token and the first optimized network traffic includes encapsulating a first message of the first optimized network traffic with the authentication token in a combined message; and
    configuring the second network traffic optimization system to further optimize the first optimized network traffic that is received from the first network traffic optimization system.

16. An apparatus, comprising:
a processor; and
a storage medium storing instructions that, when executed by the processor, cause the apparatus to perform a method of accessing multiple network traffic optimization systems, the method comprising:
    configuring a first network traffic optimization system to intercept and optimize first network traffic, wherein optimizing the first network traffic produces first optimized network traffic, and wherein the first network traffic optimization system includes multiple wide-area network (WAN) optimization devices for optimizing the first network traffic;
    receiving authentication information from a configuration portal, wherein the authentication information is required to access a second network traffic optimization system that includes a content delivery network, wherein the content delivery network includes multiple edge devices;
    providing the authentication information to the second network traffic optimization system, wherein providing the authentication information comprises:
        associating an authentication token with the first optimized network traffic, and
        communicating the authentication token and the first optimized network traffic to the second network traffic optimization system, wherein communicating the authentication token and the first optimized network traffic includes encapsulating a first message of the first optimized network traffic with the authentication token in a combined message; and
    configuring the second network traffic optimization system to further optimize the first optimized network traffic that is received from the first network traffic optimization system.

* * * * *